US008011135B2

(12) United States Patent
Masser et al.

(10) Patent No.: US 8,011,135 B2
(45) Date of Patent: Sep. 6, 2011

(54) PLANT IRRIGATION APPARATUS

(75) Inventors: Jeremy Masser, Fenton, MI (US); Matt Janowak, Fenton, MI (US)

(73) Assignee: Structural Plastics, Inc., Holly, MI (US)

( * ) Notice: Subject to any disclaimer, the term of this patent is extended or adjusted under 35 U.S.C. 154(b) by 209 days.

(21) Appl. No.: 12/406,544

(22) Filed: Mar. 18, 2009

(65) Prior Publication Data

US 2010/0236150 A1    Sep. 23, 2010

(51) Int. Cl.
*A01G 27/04*    (2006.01)

(52) U.S. Cl. ............................................... 47/81; 47/79

(58) Field of Classification Search ............... 47/59 R, 47/62 R, 62 C, 62 N, 63, 66.1, 66.5, 66.6, 47/79, 80, 81, 86, 87, 85, 82, 33, 65.9, 39; D11/143, 144, 155
See application file for complete search history.

(56) References Cited

U.S. PATENT DOCUMENTS

| | | | |
|---|---|---|---|
| 3,778,928 A | 12/1973 | Green | |
| 4,001,968 A * | 1/1977 | Green | ............................... 47/80 |
| 4,211,037 A | 7/1980 | Green | |
| 4,245,434 A | 1/1981 | Green | |
| 4,287,682 A * | 9/1981 | Browne | ............................. 47/81 |
| 4,955,158 A * | 9/1990 | Lyon | .................................. 47/81 |
| 5,117,581 A | 6/1992 | Green et al. | |
| 5,189,834 A | 3/1993 | Green | |
| 5,839,659 A | 11/1998 | Murray | |
| 6,178,691 B1 * | 1/2001 | Caron et al. | ....................... 47/79 |
| 6,357,179 B1 * | 3/2002 | Buss | .............................. 47/65.5 |
| D495,621 S | 9/2004 | Sikina | |
| 7,392,616 B1 * | 7/2008 | Bagby | ............................. 47/65.9 |
| 7,814,703 B2 * | 10/2010 | Irwin | ............................. 47/65.9 |
| 2006/0032129 A1 * | 2/2006 | Lai | ................................. 47/62 R |
| 2006/0185241 A1 | 8/2006 | Theoret et al. | |

FOREIGN PATENT DOCUMENTS

WO    WO2004056172    7/2004

* cited by examiner

*Primary Examiner* — T. Nguyen
(74) *Attorney, Agent, or Firm* — Young Basile Hanlon & MacFarlane, P.C.

(57) ABSTRACT

A plant irrigation apparatus for providing a fluid to one or more plants includes a plurality of platforms that are disposed in an array. Each platform has a support surface that is disposed at a platform elevation. A fluid reservoir for containing the fluid is defined at least partially in between adjacent platforms of the plurality of platforms. At least one fluid-regulating structure is configured to maintain a maximum elevation for the fluid, wherein the maximum elevation for the fluid is lower than the platform elevation. A capillary mat is supported by the plurality of platforms. At least a portion of the capillary mat is disposed within the fluid reservoir below the maximum elevation of the fluid.

20 Claims, 4 Drawing Sheets

PLANT IRRIGATION APPARATUS

FIELD OF THE INVENTION

The invention relates to the field of plant irrigation, and more particularly, the invention relates to a self-contained plant irrigation apparatus having an integral water reservoir.

BACKGROUND OF THE INVENTION

In large scale commercial plant-growing operations, it is known to utilize irrigation systems that distribute water to individual plants using a capillary mat. Water is typically supplied to the capillary mat by spray nozzles or perforated tubes that are spaced along the length of the capillary mat. These systems are well-suited to large-scale growing operations and to growing operations where the arrangement and placement of plants is infrequently changed, and large capital investments in infrastructure such as a water distribution system are easily justified.

In small scale plant growing operations, investment in a water distribution system is often difficult to justify, leading to the use of manual labor to water plants. In such situations, it would be desirable to have an inexpensive irrigation apparatus that reduced the required irrigation frequency, thereby decreasing labor costs.

In retail plant sales environments, displays of merchandise are dynamic, due to the demands of fluctuating inventories, changes in the configurations of displays and due to changes in the particular types of plants being sold at a given point in the season. Thus, it would be desirable to have an irrigation apparatus that is modular in nature, so that it can be readily reconfigured, repositioned and repurposed. It is also desirable to reduce the required irrigation frequency in retail plant sales environments.

SUMMARY OF THE INVENTION

The invention provides a plant irrigation apparatus for providing a fluid to one or more plants. The plant irrigation apparatus includes a plurality of platforms that are disposed in an array. Each platform has a support surface that is disposed at a platform elevation. A fluid reservoir for containing the fluid is defined at least partially in between adjacent platforms of the plurality of platforms. At least one fluid-regulating structure is configured to maintain a maximum elevation for the fluid, wherein the maximum elevation for the fluid is lower than the platform elevation. A capillary mat is supported by the plurality of platforms. At least a portion of the capillary mat is disposed within the fluid reservoir below the maximum elevation of the fluid.

The plant irrigation apparatus may include a plurality of intersecting interior channels that are defined between the plurality of platforms and which at least partially define the fluid reservoir. Furthermore, the plant irrigation apparatus may include a peripheral wall that defines a perimeter of the fluid reservoir having the platforms disposed therein and a peripheral channel having an outer boundary adjacent to the peripheral wall and an inner boundary opposite the peripheral wall and adjacent to the platforms. The peripheral channel is in fluid communication with the interior channels to define the fluid reservoir.

The surface area of the support surfaces may be large in comparison to the channels, such that the plants may be supported by two or more of the support surfaces of the platforms in cooperation with one another. Furthermore, the support surfaces of adjacent platforms may be completely separated from one another by the fluid when the fluid is disposed at the maximum fluid elevation. The support surfaces of the platforms may be circumscribed by generally upright walls that extend from a bottom surface of an adjacent channel of the interior channels to the support surface of the platform to space the support surfaces of the platforms from the bottom surfaces of the channels. Furthermore, the platforms may be substantially hollow such that a void is defined under each platform.

The support surfaces of the platforms may be substantially planar.

The fluid-regulating structure may be an aperture that extends through the peripheral wall.

BRIEF DESCRIPTION OF THE DRAWINGS

The description herein makes reference to the accompanying drawings wherein like referenced numerals refer to like parts throughout several views and wherein.

DETAILED DESCRIPTION OF THE PREFERRED EMBODIMENT

Figure 1:
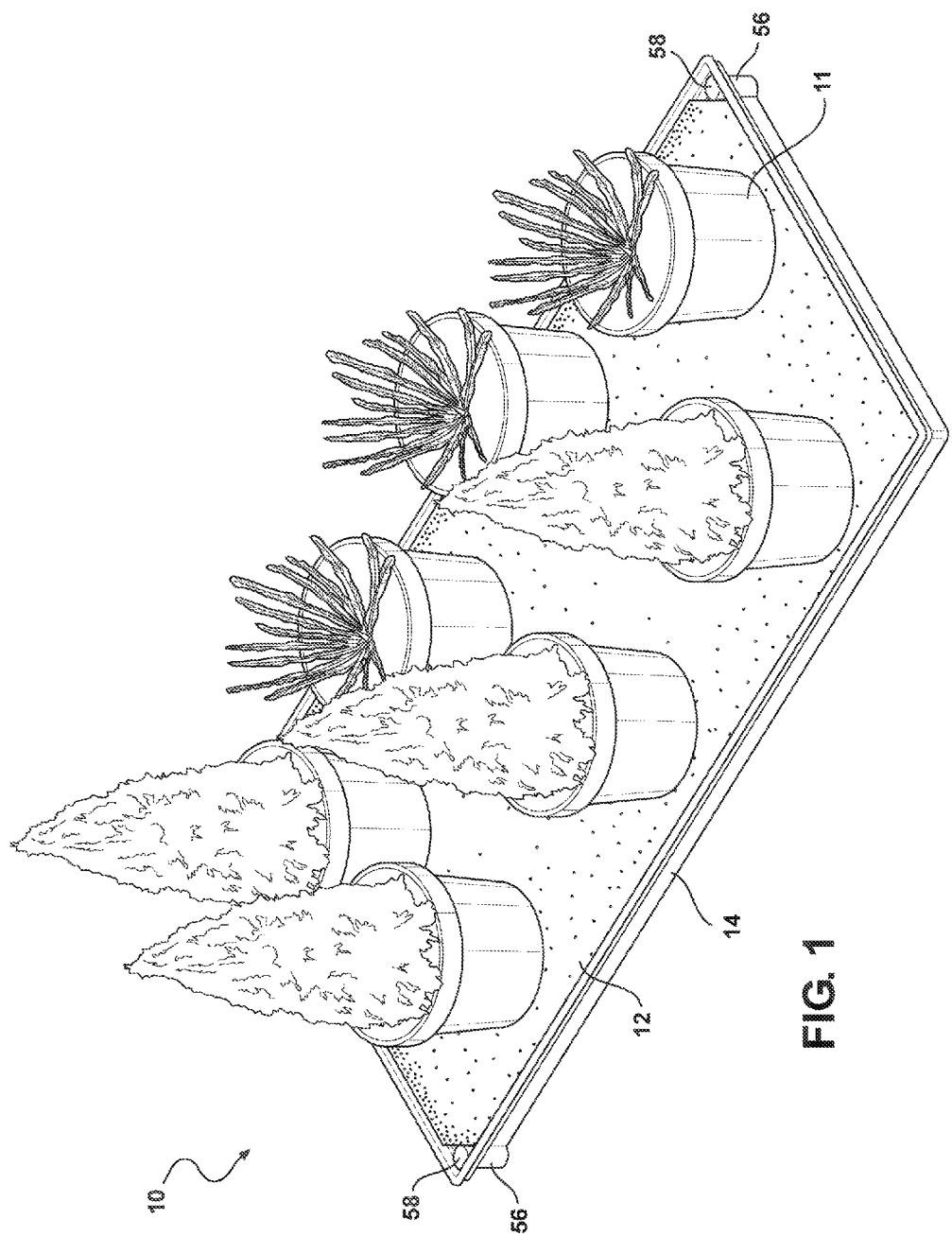
FIG. 1 is an illustration showing a plant irrigation apparatus according to the present invention.

Referring to the drawings, the present invention will now be described in detail with reference to the disclosed embodiment.

Figure 2:
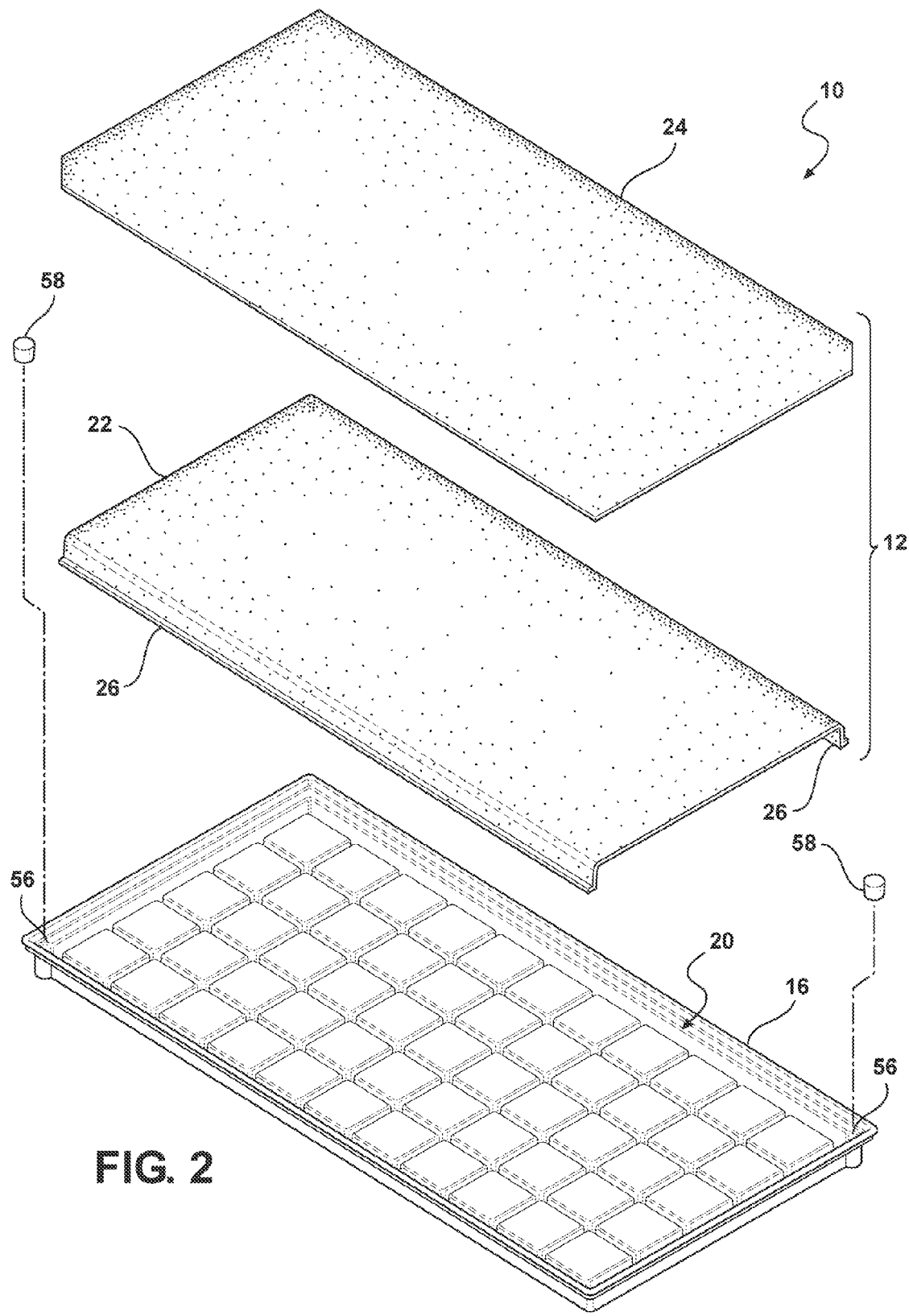
FIG. 2 is an exploded view of the plant irrigation apparatus of FIG. 1.
Figure 3:
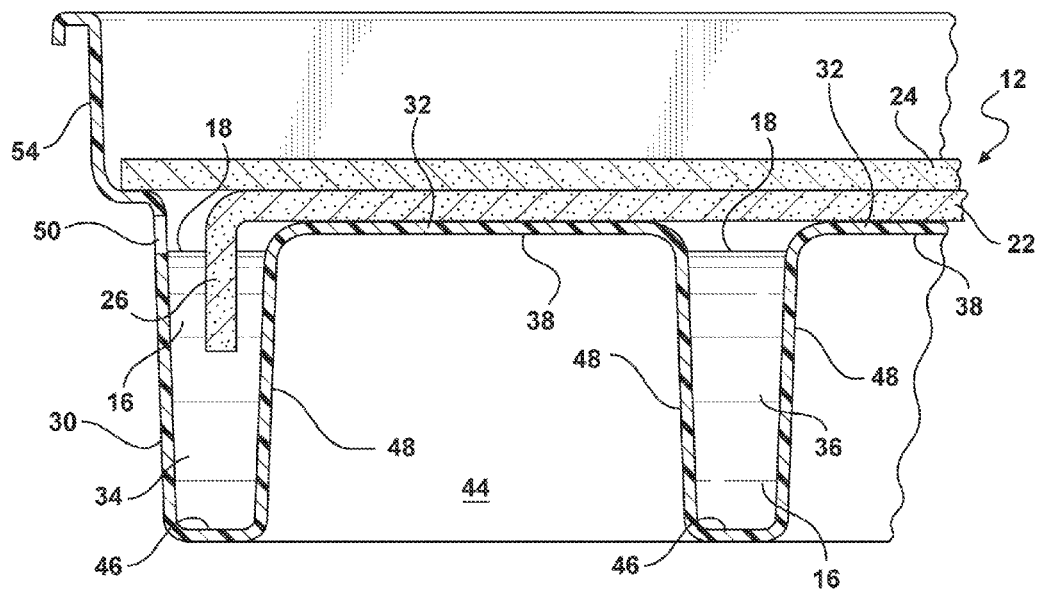
FIG. 3 is a partial cross-section view of the plant irrigation apparatus of FIG. 1.

FIGS. 1-3 show a plant irrigation apparatus 10 according to the present invention for supporting and irrigating potted plants 11. The plant irrigation apparatus 10 includes a capillary irrigation mat 12 that is supported by and within a fluid retaining tray 14. The fluid retaining tray 14 defines a fluid reservoir 16 for containing a fluid 18, such as water or a water/fertilizer solution. A plant support area 20 is disposed at a platform elevation 40 that is above a maximum fluid elevation 42. The capillary irrigation mat 12 is disposed on the plant support area 20, and at least a portion of the capillary irrigation mat 12 is disposed below the maximum fluid elevation 42 such that the capillary irrigation mat is disposed within the fluid reservoir 16 and in contact with the fluid 18.

The capillary irrigation mat 12 may be any structure capable of transmitting fluid along its surface by way of capillary action so that the capillary irrigation mat 12 can direct the fluid 18 from the fluid reservoir 16 to the potted plants 11. The capillary irrigation mat 12 can be any conventional capillary irrigation mat now known or hereafter invented. In particular, the capillary irrigation mat 12 may include one or more layers of woven or non-woven geo-textile materials having sufficient hydraulic transmissivity to transport the fluid 18 from the fluid reservoir 16 to the potted plants 11. The capillary irrigation mat 12 may consist of a single layer of geo-textile material or may comprise two or more layers of geo-textile materials.

As an example, the capillary irrigation mat 12 may be a layered structure having a substantially rigid lower layer 22 and a substantially compressible upper layer 24. Each of the lower layer 22 and the upper layer 24 are thin, substantially planar structures having a thickness around 5 mm. The lower layer 22 includes downturned lateral edge portions 26 and a central portion 28, wherein the downturned lateral edge portions 26 are adapted to be in contact with the fluid 18 in the fluid reservoir 16, while the central portion 28 is adapted to be supported upon the plant support area 20 of the fluid retaining tray 14 above the maximum elevation of the fluid 18 within the fluid reservoir 16. The lower layer 22 of the capillary irrigation mat 12 is normally completely wetted by the fluid 18. In contrast, the upper layer 24 of the capillary irrigation mat 12 has an open structure that only transmits the fluid 18 by capillary action when the upper layer 24 is compressed. Accordingly, fluid is only transmitted from the lower layer 22 of the capillary irrigation mat 12 to a top surface of the upper layer 24 of the capillary irrigation mat 12 in areas of the capillary irrigation mat 12 that are supporting a potted plant 11 and compressed thereby. While the two-layer capillary irrigation mat 12 described herein provides excellent fluid transmission qualities and is highly resistant to evaporation, it should be understood that this structure is described by way of example only and is in no way limiting of the invention.

Figure 4:
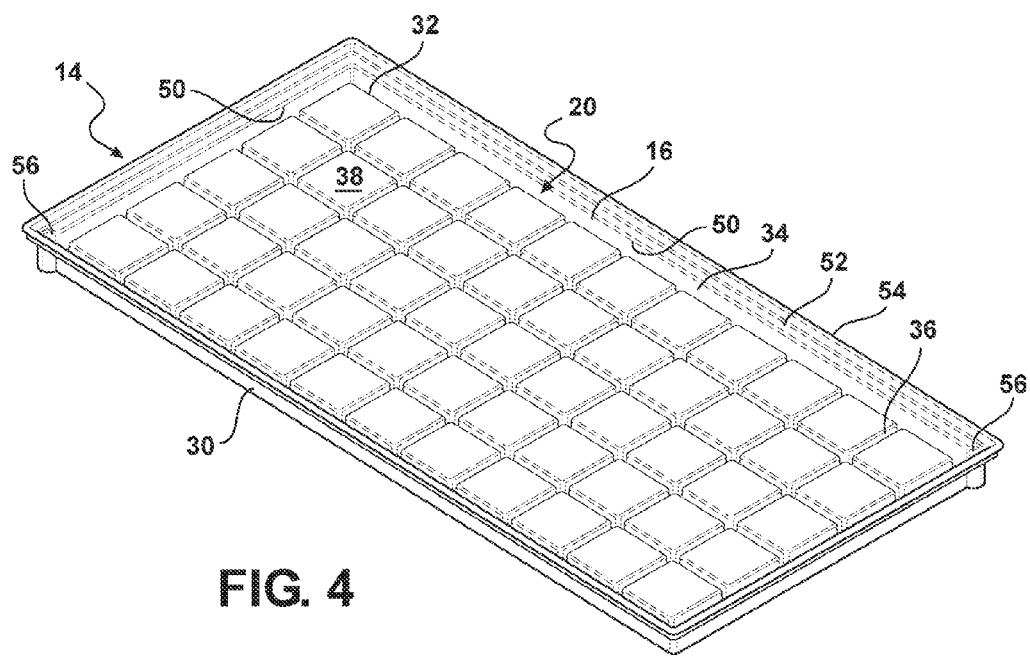
FIG. 4 is a perspective view showing a fluid retaining tray of the plant irrigation apparatus of FIG. 1.
Figure 5:
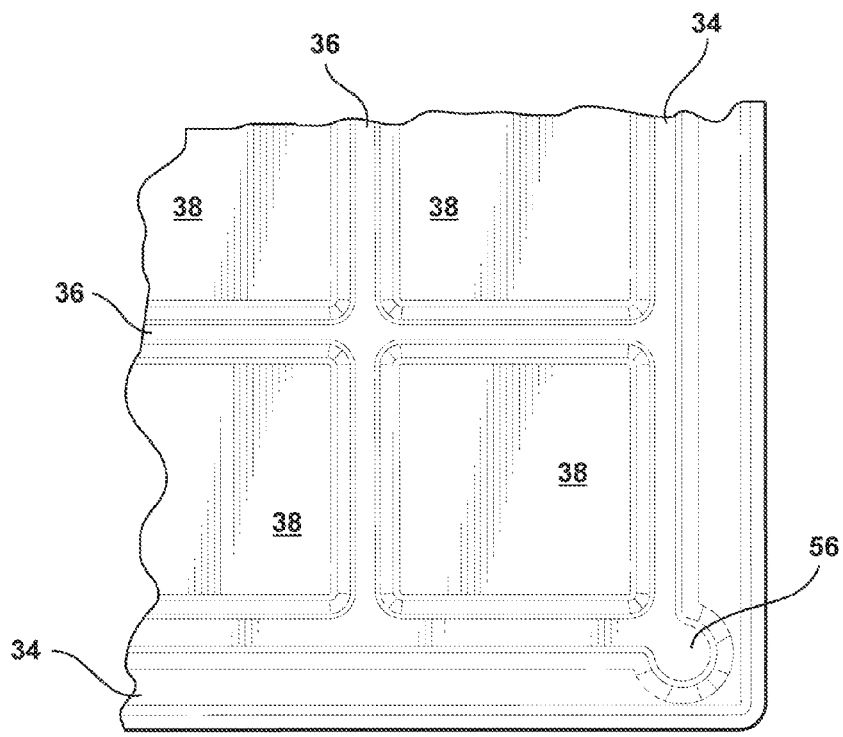
FIG. 5 is a top, detail view showing a portion of the fluid retaining tray of FIG. 4.
Figure 6:
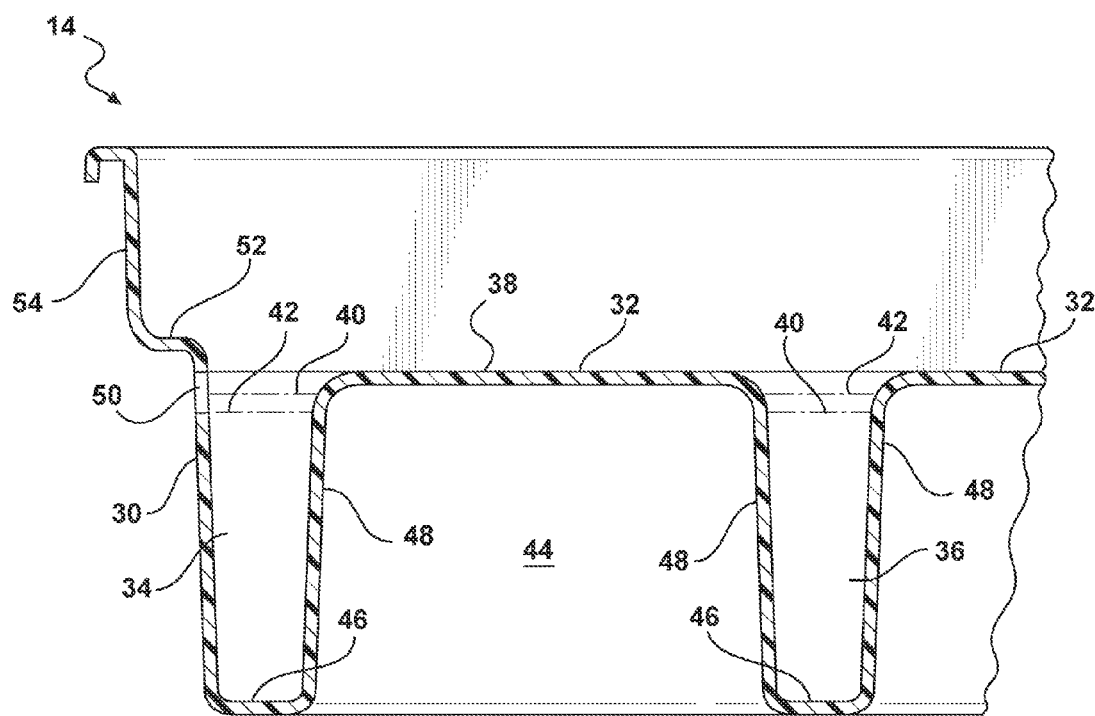
FIG. 6 is a partial cross-section view of the fluid retaining tray of FIG. 4.

As shown in FIGS. 4-6, the fluid retaining tray 14 includes a peripheral wall 30 and a plurality of platforms 32 that are disposed in a spaced rectangular array. The peripheral wall 30 defines a perimeter for the fluid reservoir 16, such that the platforms 32 are disposed inside the perimeter of the fluid reservoir 16. The peripheral wall 30 and the plurality of platforms 32 cooperate to define a peripheral channel 34 that has an outer boundary adjacent to the peripheral wall 30 and an inner boundary opposite the peripheral wall 30 and adjacent to the platforms 32, such that the peripheral channel is disposed between the peripheral wall 30 and the platforms 32. The peripheral channel 34 at least partially defines the fluid reservoir 16.

By virtue of the spaces between the platforms 32, a plurality of intersecting interior channels 36 are defined between the platforms 32. The interior channels 36 at least partially define the fluid reservoir 16. Furthermore, the peripheral channel 34 is in fluid communication with the interior channels 36. Together, the peripheral channel 34 and the interior channels 36 may define all or substantially all of the fluid reservoir 16.

In order to define the plant support area 20, each of the platforms 32 has a substantially planar, generally horizontal support surface 38. The support surface 38 of each of the platforms 32 is disposed at a platform elevation 40, which is higher than a maximum fluid elevation 42, as will be discussed in greater detail herein. However, the maximum fluid elevation 42 is near the platform elevation 40, such that the support surfaces 38 of adjacent platforms 32 are completely separated from one another by the fluid 18 when the fluid 18 is disposed at the maximum fluid elevation 42. The platforms 32 are substantially hollow, such that a void 44 is defined under each of the platforms 32.

Each of the peripheral channel 34 and the interior channels 36 are defined in part by a bottom surface 46. The bottom surfaces 46 of the peripheral channel 34 and the interior channels 36 are all disposed at a common elevation to define a substantially grid-like bottom for the fluid retaining tray 14 on which the fluid retaining tray 14 is supported with respect to an exterior surface or structure, such as the ground or a shelf (not shown). The peripheral channel 34 and the interior channels 36 are all at least partially defined by a plurality of generally upright walls 48. The generally upright walls 48 extend from the bottom surfaces 46 of the peripheral channel 34 and the interior channels 36 to the support surfaces 38 of respective ones of the platforms 32. Thus, the generally upright walls 48 serve to space the support surfaces 38 from the bottom surfaces 46 of the peripheral channel 34 and the interior channels 36 as well as to support the support surfaces 38 with respect to the bottom surfaces 46 of the peripheral channel 34 and the intersecting interior channels 36.

The surface area of the support surfaces 38 of the platforms 32 is large in comparison to the surface area of the interior channels 36 at the platform elevation 40, such that the potted plants 11 may be supported by two or more of the support surfaces 38 of the platforms 32 in cooperation with one another. In particular, the interior channels 36 may define a channel width, and the support surfaces 38 may define a support width, wherein the support width is greater than the channel width, such that the potted plants 11 may be supported by two or more of the support surfaces 38 of the platforms 32 in cooperation with one another.

In order to maintain the fluid 18 within the fluid reservoir 16 at or below a maximum fluid elevation 42, the fluid retaining tray 14 includes at least one fluid regulating structure that is configured to maintain the maximum fluid elevation 42. In particular, the fluid regulating structure may be provided in the form of one or more apertures 50 that extend through the peripheral wall 30 of the fluid retaining tray 14. The apertures 50 are disposed such that their lower extents are substantially aligned with the desired maximum fluid elevation 42 such that any of the fluid 18 that is disposed above the maximum fluid elevation 42 exits the fluid reservoir 16 through the apertures 50 and drains out of the fluid retaining tray 14. It should be noted that the apertures 50 could be provided in other locations on the fluid retaining tray 14. For example, the apertures 50 could be provided on the generally upright walls 48.

The fluid retaining tray 14 may be provided with an internal lip 52 for supporting the upper layer 24 of the capillary irrigation mat 12. The internal lip 52 is disposed above the peripheral wall 30 and is bounded by a peripheral rim 54 of the fluid retaining tray 14. Filling tubes 56 may extend downward through the internal lip 52 at the corners of the peripheral wall 30 and in communication with the fluid reservoir 16. The filling tubes 56 are not covered by the capillary irrigation mat 12 when it is disposed within the fluid retaining tray 14 and thus allow access to the fluid reservoir 16 for filling the fluid reservoir 16 with the fluid 18 while the capillary irrigation mat 12 was in place. Plugs 58 (FIGS. 1-2) may be provided to close the filling tubes 56 when they are not in use and thus prevent evaporation losses from the fluid reservoir 16.

The fluid retaining tray 14 is typically a thin-walled structure and is preferably fabricated as a one-piece, vacuum-formed structure. Thus, it will be understood that by providing a plant support area 20 that is comprised of a plurality of platforms 32 that are disposed in an array, the generally upright walls 48, which circumscribe each of the platforms 32, provide a high degree of rigidity and load supporting capacity to the plant support area 20. Furthermore, by spacing the platforms 32 with respect to one another to define the interior channels 36, the fluid reservoir 16 may be provided while still allowing the fluid retaining tray 14 to be fabricated by vacuum forming, since the support surfaces 38 are not disposed above any portion of the fluid reservoir 16, but rather are disposed above the voids 44.

While the invention has been described in connection with what is presently considered to be the most practical and preferred embodiment, it is to be understood that the invention is not to be limited to the disclosed embodiments, but to the contrary, it is intended to cover various modifications or equivalent arrangements included within the spirit and scope of the appended claims. The scope is to be accorded the broadest interpretation so as to encompass all such modifications and equivalent structures as is permitted under the law.

What is claimed is:

1. A plant irrigation apparatus for providing a fluid to one or more plants, comprising:
   a plurality of platforms disposed in an array, each platform having a support surface disposed at a platform elevation;
   a fluid reservoir for containing the fluid, the fluid reservoir defined at least partially in between adjacent platforms of the plurality of platforms;
   at least one fluid level regulating structure configured to maintain a maximum elevation for the fluid, wherein the maximum elevation is lower than the platform elevation; and
   a capillary mat supported by the plurality of platforms by direct engagement of the capillary mat with the support surfaces of the platforms, wherein at least a portion of the capillary mat is disposed within the fluid reservoir below the maximum elevation of the fluid.

2. The plant irrigation apparatus of claim 1, wherein a plurality of intersecting interior channels are defined between the plurality of platforms, the interior channels at least partially defining the fluid reservoir.

3. The plant irrigation apparatus of claim 2, further comprising:
   a peripheral wall defining a perimeter of the fluid reservoir, wherein the platforms are disposed inside the perimeter; and
   a peripheral channel that extends continuously along the perimeter of the fluid reservoir having an outer boundary adjacent to the peripheral wall and an inner boundary opposite the peripheral wall and adjacent to the platforms, wherein the peripheral channel is in fluid communication with the interior channels to define the fluid reservoir, and the platforms are spaced from the peripheral wall by the peripheral channel.

4. The plant irrigation apparatus of claim 2, wherein the surface area of the support surfaces is large in comparison to the channels, such that the plants are supportable by two or more of the support surfaces of the platforms in cooperation with one another.

5. The plant irrigation apparatus of claim 2, wherein the support surfaces of adjacent platforms are completely separated from one another by the fluid when the fluid is disposed at the maximum fluid elevation.

6. The plant irrigation apparatus of claim 2, wherein the support surfaces of the platforms are circumscribed by generally upright walls that extend from a bottom surface of an adjacent channel of the interior channels to the support surface of the platform to space the support surfaces of the platforms from the bottom surfaces of the channels.

7. The plant irrigation apparatus of claim 1, wherein the platforms are substantially hollow, such that a void that is not in fluid communication with the fluid reservoir is defined under each platform.

8. The plant irrigation apparatus of claim 7, wherein the support surfaces of the platforms are substantially planar.

9. The plant irrigation apparatus of claim 3, wherein the fluid regulating structure is an aperture than extends through the peripheral wall.

10. A plant irrigation apparatus for providing a fluid to one or more plants, comprising:
    a plurality of platforms, each having a support surface disposed at a platform elevation, wherein the plurality of platforms are spaced with respect to one another to define a plurality of intersecting interior channels that at least partially define a fluid reservoir;
    at least one fluid level regulating structure configured to maintain a maximum elevation for the fluid, wherein the maximum elevation is lower than the platform elevation; and
    a capillary mat supported by the plurality of platforms, the capillary mat having a lower layer that is in direct engagement with the platforms and an upper layer that is disposed on the lower layer and is spaced from the platforms by the lower layer, wherein at least a portion of the lower layer of the capillary mat is disposed within the fluid reservoir below the maximum elevation of the fluid such that the lower layer of the capillary mat is normally completely wetted by the fluid, and the upper layer of the capillary mat has a structure that only transmits the fluid by capillary action in response to compression of the upper layer of the capillary mat, such that the fluid is transmitted from the lower layer of the capillary mat to a top surface of the upper layer of the capillary mat in response to compression of the upper layer of the capillary mat.

11. The plant irrigation apparatus of claim 10, further comprising:
    the interior channels having a channel width; and
    the support surfaces having a support width, wherein the support width is greater than the channel width, and the capillary mat is supported by direct engagement of the capillary mat with the support surfaces of the platforms, such that the plants are supportable by two or more of the support surfaces of the platforms in cooperation with one another.

12. The plant irrigation apparatus of claim 11, wherein the support surfaces of the platforms are circumscribed by generally upright walls that extend from a bottom surface of an adjacent channel of the interior channels to the support surface of the platform to space the support surfaces of the platforms from the bottom surfaces of the channels.

13. The plant irrigation apparatus of claim 12, wherein the platforms are substantially hollow, such that a void that is not in fluid communication with the fluid reservoir is defined under each platform.

14. The plant irrigation apparatus of claim 12, wherein the support surfaces of the platforms are substantially planar and generally horizontal, and the support surfaces of the platforms cooperate to define a plant support area.

15. A plant irrigation apparatus for providing a fluid to one or more plants, comprising:
    a fluid retaining tray fabricated as a one-piece vacuum-formed structure, the fluid retaining tray including:
    a plurality of support surfaces disposed in a spaced array, the support surfaces disposed at a platform elevation such that voids are defined under each support surface,
    a plurality of channel bottom surfaces, at least some of the channel bottom surfaces disposed between adjacent pairs of the support surfaces to provide a substantially grid like bottom for the fluid retaining tray,
    each support surface circumscribed by a plurality of generally upright walls that extend from the support surfaces to the channel bottom surfaces to space the support surfaces from the channel bottom surfaces,
    a peripheral wall that cooperates with the channel bottom surfaces and the generally upright walls to at least partially define a fluid reservoir for containing the fluid, and at least one fluid level regulating structure configured to maintain a maximum elevation for the fluid, wherein the maximum elevation is lower than the platform elevation; and a capillary mat supported by the plurality of support surfaces by direct engagement of the capillary mat with the support surfaces, wherein at least a portion of the capillary mat is disposed within the fluid reservoir below the maximum elevation of the fluid.

16. The plant irrigation apparatus of claim 15, further comprising:

the support surfaces spaced from one another by a channel width; and the support surfaces having a support width, wherein the support width is greater than the channel width, such that the plants may be supported by two or more of the support surfaces in cooperation with one another.

17. The plant irrigation apparatus of claim 16, wherein adjacent pairs of the support surfaces are completely separated from one another by the fluid when the fluid is disposed at the maximum fluid elevation.

18. The plant irrigation apparatus of claim 15, wherein the support surfaces are substantially planar.

19. The plant irrigation apparatus of claim 15, wherein the fluid regulating structure is an aperture than extends through the peripheral wall.

20. The plant irrigation apparatus of claim 10, further comprising:

a support structure that is in engagement with the upper layer of the capillary mat for supporting the upper layer of the capillary mat above the platform elevation.

* * * * *